Nov. 3, 1964 — A. NISHKIAN — 3,155,055
PATTY SHELL FORMING DEVICE
Filed Aug. 10, 1960
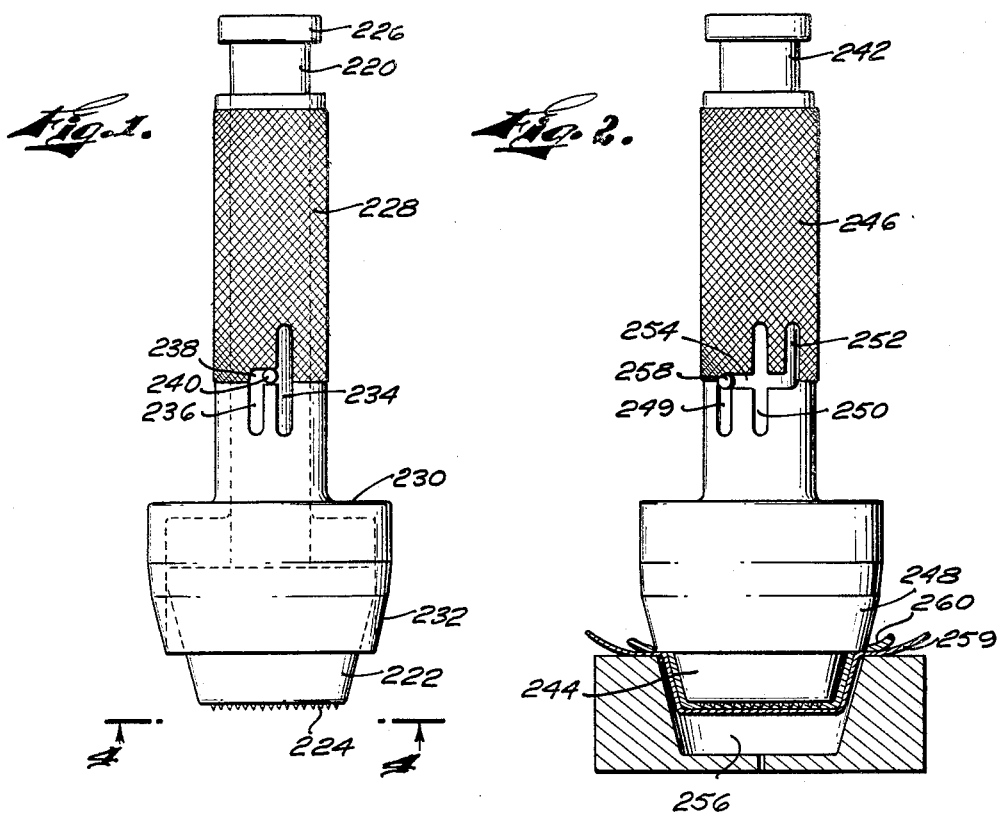
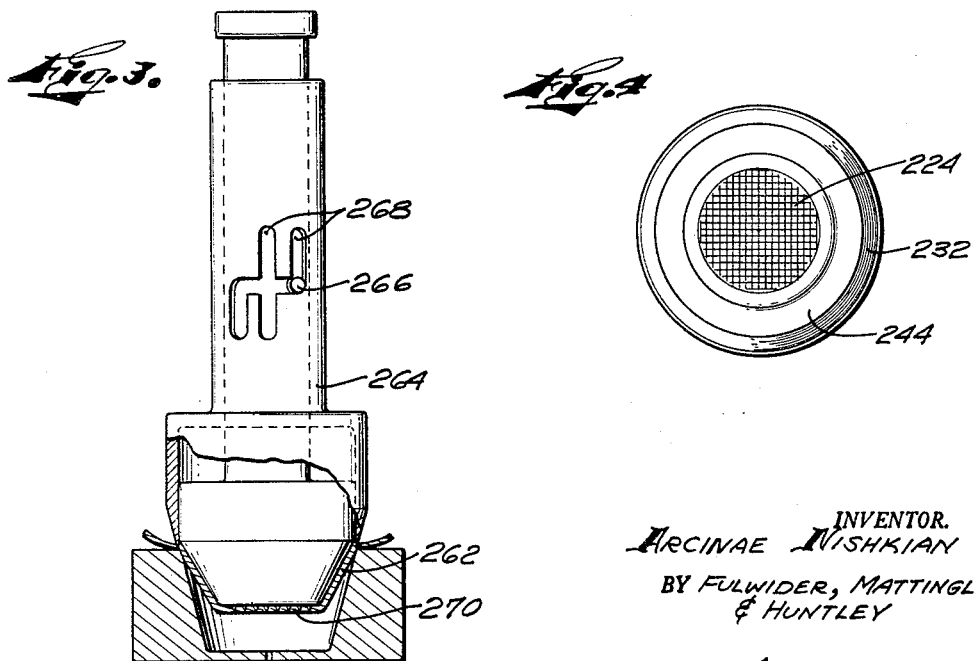
INVENTOR.
ARCINAE NISHKIAN
BY FULWIDER, MATTINGLY & HUNTLEY
ATTORNEYS

United States Patent Office 3,155,055
Patented Nov. 3, 1964

3,155,055
PATTY SHELL FORMING DEVICE
Arcinae Nishkian, 703 Pico Blvd., Santa Monica, Calif.
Filed Aug. 10, 1960, Ser. No. 48,681
5 Claims. (Cl. 107—15)

This invention relates generally to tools for molding various shapes and sizes of pastries, such as patty shells, in a forming cavity.

One of the main objects of the invention is to provide a manually operated molding tool that can be varied in design for use with a forming cavity or mold.

Another object of the invention is to provide a manually operated patty shell molding tool in which a telescoping dough cutter is sleeved to the plunger that extends from the molding head.

A further object of the present invention is to provide a patty shell molding device which is foolproof in operation and may be readily operated by housewives.

Yet a further object of the invention is to provide apparatus of the aforedescribed nature which is simple in design and rugged of construction whereby it may provide a long and trouble-free service life.

Still another object of the invention is in the provision of a manually operated device susceptible of variance in the size of cutter and form of the head to produce unlimited sizes and forms of patty shells.

With the foregoing objects in view, and such other objects and advantages as will become apparent to those skilled in the art to which this invention relates as this specification proceeds, the invention consists essentially in the arrangement and construction of parts all as hereinafter more particularly described, reference being had to the accompanying drawing in which:

FIGURE 1 is an elevational view of a device embodying the present invention;

FIGURE 2 is an elevational view of a modified form of the device of FIGURE 1;

FIGURE 3 is an elevational view partially in section of a modified form of the device of FIGURE 2; and FIGURE 4 is a view taken on the lines 4—4 of FIGURE 1.

In the drawings a manually operated type of patty shell forming device is disclosed which is particularly adapted for individual use in the home. The device can be manipulated manually by physically sustaining the plunger and cutter in various positions to form any depth of patty shell desired. Means is also provided for prior selective positioning of the cutter and plunger so that the device may be used rapidly to produce uniformly shaped shells.

More particularly, and with reference to FIGURE 1, a plunger 220 projects from a tapered head 222. The lower edge of the head 222 has a waffle like type of perforating area 224 to release any air trapped between the dough 260 and the mold. The plunger 220 is capped at 226. A sleeve 228 is slidably mounted on the plunger 220. The sleeve 228 is flanged outwardly at 230. From the flange 230 a cutter 232 extends downwardly in a telescoping manner about the head 222. It is contemplated that the size of the cutter and the size of the mold be varied as desired to produce different forms of patty shells. A large cutter and small plunger head of varied angles and depths may be used. A small head and large mold will make varying sizes and shapes of patty shells. The sleeve 228 has an elongated slot 234, a shorter slot 236 and a transverse connecting slot 238. A pin 240 projecting laterally from the plunger engages the slots and is movable from one to the other. If the pin is moved into the elongated slot 234, it is possible for the operator to manually manipulate the tool to any degree of mold penetration or to operate it rapidly to produce uniformly shaped shells. If the pin is moved to the shorter slot 236, the same depth of mold penetration is permitted but sleeve actuation is limited so that the device may be used rapidly over a pan having multiple molds. Other restraining means than the slot and pin construction can be used to accomplish the same result.

In FIGURE 2, a capped plunger 242 has a tapered mold head 244 and telescoping sleeve 246 and cutter 248. Parallel disposed slots 249, 250 and 252 in the sleeve 246 are connected by a transverse slot 254. The plunger head in this instance is smaller than the mold 256 and depends partially therein to form a different size and shape of patty shell. A pin 258 projecting laterally from the plunger 242 operates exactly as previously described except when disposed in slot 252. At that time, the plunger head 244 has shorter penetration of the mold 256 and a still different size and shape of patty shell is produced. The tool may be operated rapidly as desired to produce uniformly shaped shells. In FIGURE 2, a sheet of aluminum foil 259 is disposed beneath the dough 260 with the result that the cutter 248 severs the dough but not the foil. The patty shell may then be baked within the foil. The cutter 248 may be sufficiently sharp to sever the foil evenly about the shell if desired.

In FIGURE 3, a similar type tool having plunger head 262 and telescoping sleeve cutter 264 is disclosed. A similar pin 266 engages similar plural slots 268 and the operation is exactly as previously described. However, the plunger head 262 is tapered at a different angle and does not penetrate the mold fully. The waffle like face 270 penetrates the dough in an elevated position. An entirely different shape of patty shell is produced. It is not believed necessary by drawing to indicate that multiple varied angles of the plunger head can be used to produce practically any shape or size of shell desired. The plunger head may be rounded and with variations thereof.

The tool has multiple uses besides the actual molding of the patty shells. The circular separated portions of the dough may be covered with various fillings and a second circular section pressed or crimped thereover by the tool prior to baking. Various other dough fashioning and cutting uses are possible.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Apparatus for forming a plurality of shapes of patty shells, comprising:

a mold having a downwardly tapered dough-receiving cavity;

and a molding tool having a vertical plunger formed at its lower portion with a downwardly tapered head configured to enter said mold cavity to a desired maximum depth, a sleeve slidably telescopically encompassing said plunger and formed with a cutter at its lower portion that engages and severs said dough around said mold cavity after said head enters said mold cavity, and restraining means operatively interposed between said plunger and said sleeve to limit the depth said head assumes within said mold cavity between said maximum depth and a lesser depth.

2. Apparatus as set forth in claim 1 wherein the underside of said head is formed with dough perforating means.

3. Apparatus as set forth in claim 1 wherein said restraining means includes a plurality of vertical slots of different lengths in said sleeve connected by a horizontal slot and a horizontal pin extending from said plunger into said slots.

4. Apparatus for forming a plurality of shapes of patty shells disposed within a sheet of foil, comprising:
- a mold cavity, said sheet of foil being disposed over the upper end of said cavity while flat with said dough layer resting upon the upper surface of said sheet of foil;
- and a molding tool having a vertical plunger formed at its lower portion with a downwardly tapered head configured to enter said mold cavity to a desired maximum depth and thereby simultaneously deform said dough layer and foil sheet into the configuration of a patty shell, a sleeve slidably telescopically encompassing said plunger and formed with a cutter at its lower portion that engages and severs said dough around said mold cavity after said head enters said mold cavity, and restraining means operatively interposed between said plunger and said sleeve to limit the depth said head assumes within said mold cavity between said maximum depth and a lesser depth.

5. Apparatus as set forth in claim 4 wherein the underside of said head is formed with dough perforating means.

References Cited in the file of this patent
UNITED STATES PATENTS

| | | |
|---|---|---|
| 138,528 | Reed | May 6, 1873 |
| 662,748 | Wood | Nov. 27, 1900 |
| 782,615 | Manning | Feb. 14, 1905 |
| 808,015 | Coppins | Dec. 19, 1905 |
| 903,584 | Kohler | Nov. 10, 1908 |
| 1,548,659 | Christianson | Aug. 4, 1925 |
| 2,127,651 | Panther | Aug. 23, 1938 |
| 2,409,021 | Dale | Oct. 8, 1946 |
| 2,664,834 | Balton | Jan. 5, 1954 |
| 2,896,555 | Marcus | July 28, 1959 |

FOREIGN PATENTS

| | | |
|---|---|---|
| 246,617 | Great Britain | Feb. 4, 1926 |
| 309,695 | Great Britain | Apr. 18, 1929 |